US010313850B2

United States Patent
Kumar et al.

(10) Patent No.: US 10,313,850 B2
(45) Date of Patent: Jun. 4, 2019

(54) SYSTEMS AND METHODS FOR UPGRADING FIRMWARE IN MULTIPLE DEVICES OF A WIRELESS FIRE DETECTION SYSTEM

(71) Applicant: Honeywell International Inc., Morristown, NJ (US)

(72) Inventors: Prajnith V. Kumar, Mangalore (IN); Girish Jangam Gangadharam, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/657,421

(22) Filed: Jul. 24, 2017

(65) Prior Publication Data

US 2019/0028831 A1 Jan. 24, 2019

(51) Int. Cl.
| | |
|---|---|
| *H04W 4/38* | (2018.01) |
| *G06F 9/445* | (2018.01) |
| *G06F 8/65* | (2018.01) |
| *H04L 29/08* | (2006.01) |
| *H04W 4/50* | (2018.01) |

(52) U.S. Cl.
CPC ............ *H04W 4/38* (2018.02); *G06F 8/65* (2013.01); *G06F 9/445* (2013.01); *H04L 67/10* (2013.01); *H04W 4/50* (2018.02); *H04L 29/08* (2013.01)

(58) Field of Classification Search
None
See application file for complete search history.

(56) References Cited

U.S. PATENT DOCUMENTS

| 5,748,981 A | 5/1998 | Patchen et al. |
| 8,316,364 B2 * | 11/2012 | Stein .................. G06F 8/65 |
| | | 717/172 |

(Continued)

FOREIGN PATENT DOCUMENTS

| EP | 2375323 A1 * | 10/2011 | .............. G06F 8/65 |
| EP | 2 763 428 A1 | 8/2014 | |

(Continued)

OTHER PUBLICATIONS

TechTarget, IoT Agenda, 2016, publsihed at https://internetofthingsagenda.techtarget.com/definition/Internet-of-Things-IoT.*

(Continued)

*Primary Examiner* — Hossain M Morshed
(74) *Attorney, Agent, or Firm* — Brooks, Cameron & Huebsch, PLLC

(57) ABSTRACT

Systems and methods for upgrading firmware in multiple devices of a connected system are provided. Some systems can include a plurality of system devices in a mesh network of the connected system and a gateway device coupled to the mesh network. The gateway device can initially seed a firmware upgrade for the plurality of system devices, and some of the plurality of system devices can subsequently seed the firmware upgrade for other ones of the plurality of system devices.

16 Claims, 5 Drawing Sheets

(56) References Cited

U.S. PATENT DOCUMENTS

| | | | | |
|---|---|---|---|---|
| 8,589,907 | B2* | 11/2013 | Chung | H04L 41/082 709/221 |
| 9,165,456 | B2* | 10/2015 | Grady | G08C 15/00 |
| 9,763,062 | B2* | 9/2017 | Ibarra | H04W 4/06 |
| 2002/0049760 | A1* | 4/2002 | Scott | G06F 17/30067 |
| 2003/0182428 | A1 | 9/2003 | Li et al. | |
| 2006/0048144 | A1* | 3/2006 | Willess | G06F 8/61 717/177 |
| 2008/0130639 | A1* | 6/2008 | Costa-Requena | G06F 8/65 370/389 |
| 2011/0119662 | A1* | 5/2011 | Chen | G06F 8/65 717/168 |
| 2014/0089912 | A1 | 3/2014 | Wang et al. | |
| 2014/0223424 | A1* | 8/2014 | Han | G06F 8/654 717/173 |
| 2016/0080198 | A1* | 3/2016 | Liu | H04L 41/082 370/338 |
| 2018/0143819 | A1* | 5/2018 | Gross | G01R 31/44 |

FOREIGN PATENT DOCUMENTS

| | | |
|---|---|---|
| WO | WO 2006/012390 A2 | 2/2006 |
| WO | WO 2008/142079 A1 | 11/2008 |

OTHER PUBLICATIONS

Rkris, "Over the air firmware upgrade in the WiSense mesh network", 2013, Published by WiSense at https://wisense.wordpress.com/2015/09/04/over-the-air-firmware-upgrade-in-the-wisense-mesh-network/ (Year: 2013).*

Lopattanakij, et al., "Decentralized Software Upgrading in Remote Network Based on Embedded Linux", 2013 IEEE International Conference on Signal Processing, Communication, and Computing, Aug. 1, 2013, 4 pages.

Honeywell, "Swift Smart Wireless Integrated Fire Technology", Gamewell Fire Control, https://www.gamewell-fci.com/catalogdocuments/spfq48101_swift_faq_gw-fci.pdf, 2014, 2 pages.

Pingale, et al., "Design Aspects for Upgrading Firmware of a Resource Constrained Device in the Field", 2016 IEEE International Conference on Recent Trends in Electronics, Information, and Communication Technology, May 1, 2016, 5 pages.

Chiu, et al., "Widest Spanning Tree for Multi-Channel Multi-Interface Wireless Mesh Networks", Wireless Communications and Networking Conference, WCNC 2008, Mar. 31, 2018, 6 pages. z.

Extended Search Report and Written Opinion from related European Application No. 18176344, dated Jan. 2, 2019, 13 pages.

* cited by examiner

SYSTEMS AND METHODS FOR UPGRADING FIRMWARE IN MULTIPLE DEVICES OF A WIRELESS FIRE DETECTION SYSTEM

FIELD

The present invention relates generally to a wireless fire detection system. More particularly, the present invention relates to systems and methods for upgrading firmware in multiple devices of a wireless fire detection system.

BACKGROUND

Known wireless fire detection systems can include a large number of system devices that are part of a mesh network and need upgrading from time to time. It is known to upgrade the firmware in the system devices via a master device, for example, a gateway device, sending a firmware file for firmware data of a firmware upgrade to a slave device, for example, a first of the system devices. After the firmware upgrade is complete at the first of the system devices, the gateway device can initiate the firmware grade with a second of the system devices and so forth.

For example, FIG. 1 is a block diagram of a wireless fire detection system 100 known in the art. As seen in FIG. 1, the single master device, the gateway device 110, seeds the firmware upgrade for each of the system devices 120 in the system 100, and the firmware upgrade is performed at each of the system devices 120 one at a time. Accordingly, the system devices 120 must wait to receive the firmware upgrade from the master device 110. Although FIG. 1 shows the gateway device 110 directly connected to each of the system devices 120, it is to be understood that data from the master device 110 can be routed to a target device of the system devices 120 via intermediate devices of the system devices 120 if the target device is not a direct child device of the gateway device 110.

Known systems and methods to can take a long time upgrade the firmware in the system devices when there are a large number of system devices because the system devices are upgraded one at a time. Even context switching in known systems and methods can take a long time because after the firmware upgrade of the first of the system devices is complete, the gateway device must terminate a connection with the first of the system devices and initiate a handshake with the second of the system devices to initiate the firmware upgrade with the second of the system devices. Furthermore, if the firmware upgrade fails, known systems and methods must restart the firmware upgrade from the beginning.

To implement known systems and methods to upgrade the firmware in the system devices, each microcontroller or programmable processor in one of the system devices that requires the firmware upgrade must include a separate boot loader. For example, FIG. 2 is a block diagram of the system device 120 with a primary microcontroller 122 and a secondary microcontroller 124 known in the art. When both the primary microcontroller 122 and the secondary microcontroller 124 require the firmware upgrade from a gateway device 110, each of the primary microcontroller 122 and the secondary microcontroller 124 requires a respective boot loader 123, 125 as seen in FIG. 2. Furthermore, interprocessor communication (IPC) between the primary microcontroller 122 and the secondary microcontroller 124 must be secured. The entire configuration of such known systems and methods can require more time to upgrade the firmware of the secondary microcontroller 124.

In view of the above, there is a continuing, ongoing need for improved systems and methods.

DETAILED DESCRIPTION

Figure 1:
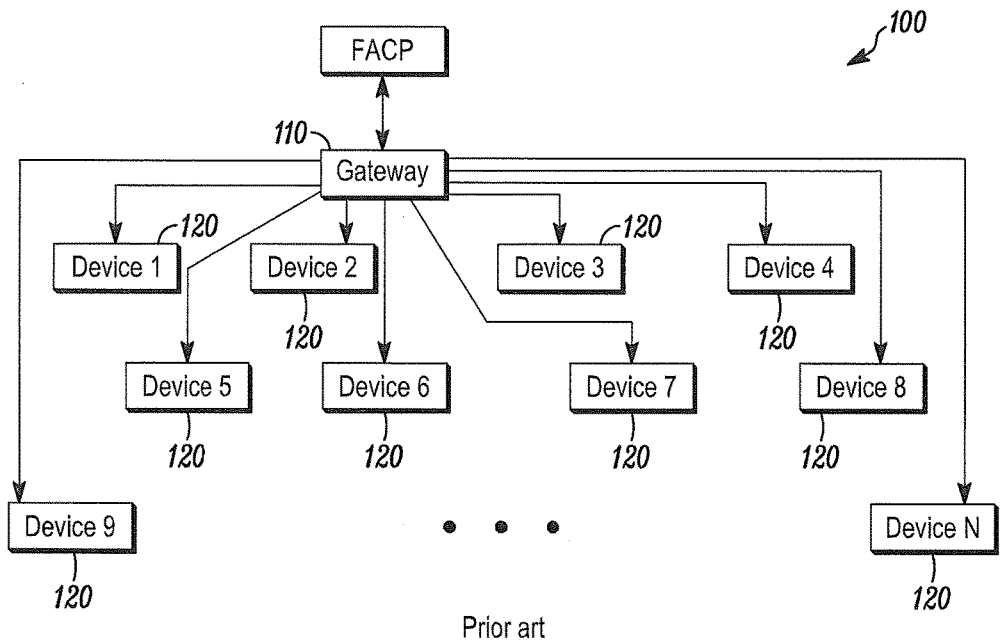
FIG. 1 is a block diagram of a wireless fire detection system known in the art.
Figure 2:
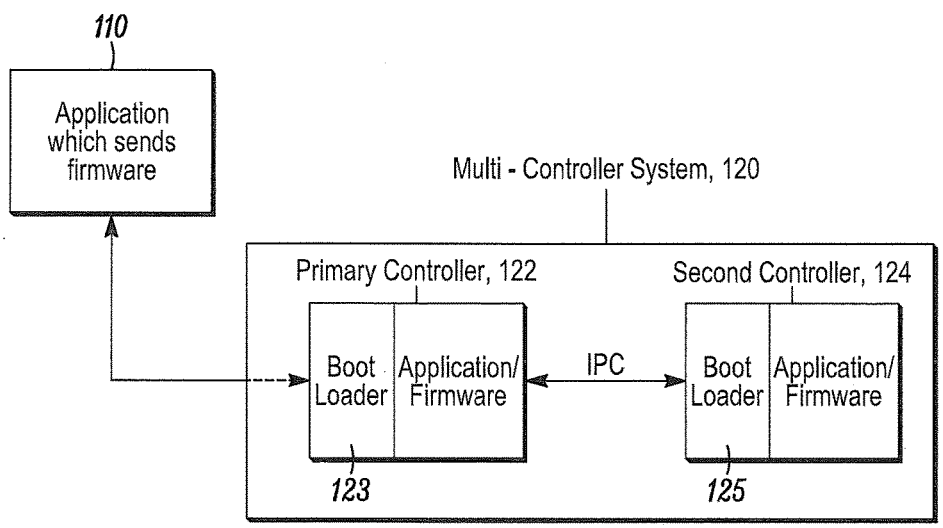
FIG. 2 is a block diagram of a system device with a primary microcontroller and a secondary microcontroller known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for upgrading firmware in multiple devices of a wireless fire detection system. Systems and methods disclosed herein are described in connection with wireless fire detection systems. However, it is to be understood that systems and methods disclosed herein are not so limited and could be used in connection with a security system or any connected system with internet of things (IoT) devices.

In accordance with disclosed embodiments, system devices in the wireless fire detection system can be part of a mesh network, and the firmware in multiple system devices can be upgraded simultaneously, thereby achieving parallelization in the firmware upgrade, avoiding CPU loading, and reducing the overall time to upgrade all of the system devices. For example, because handshakes with all system devices can happen in parallel, the time for context switching while initiating the firmware upgrade with one of the system devices can be eliminated.

In accordance with disclosed embodiments, the firmware upgrade can be divided into parts or chunks. Accordingly, if the firmware upgrade for one of the system devices fails, only the part or chunk of the firmware upgrade that failed needs to be re-flashed to the one of the system devices. Accordingly, systems and methods disclosed herein can avoid restarting the firmware upgrade from the beginning, thereby reducing the overall time to upgrade the system devices.

In accordance with disclosed embodiments, firmware data of the firmware upgrade can be seeded by a plurality of devices, including a gateway device and the system devices. For example, in some embodiments, the firmware data can be initially seeded or transmitted by the gateway device to one or more of the system devices. When a first of the system devices has received a portion of the firmware data, for example, all of the firmware upgrade or a first part or chunk of the firmware upgrade, the first of the system devices can seed that portion of the firmware data to other ones of the system devices. Accordingly, in some embodiments, a second of the system devices can receive some or all of the firmware upgrade from the gateway device or from the first of the system devices. For example, when the first of the system devices has received the first part or chunk of the firmware upgrade, the second of the system devices can receive the first part or chunk of the firmware upgrade directly or indirectly from the first of the system devices. In this manner, the system devices can receive multiple parts or chunks of the firmware upgrade from different devices simultaneously.

As a further example, the firmware data of the firmware upgrade can be divided into multiple parts, PART-1, PART-2 . . . PART-N. The first of the system devices can receive PART-1 of the firmware upgrade while the second of the system devices can receive PART-2 of the firmware upgrade, etc. When the first of the system devices has received all of PART-1 of the firmware upgrade, the first of the system devices can receive PART-2 of the firmware upgrade from the gateway device, from the second of the system devices, or from any other ones of the system devices that can seed PART-2 of the firmware upgrade. Accordingly, instead of waiting for all of the firmware data of the firmware upgrade from the single gateway device, the system devices can be upgraded and can request and receive the firmware data from multiple devices, thereby reducing the overall time to upgrade the system devices.

In accordance with disclosed embodiments, all of the system devices can be capable of full duplex communication. Accordingly, the system devices can both receive the firmware data of the firmware upgrade from other system devices in the mesh network and seed or send the firmware data of the firmware upgrade to other system devices in the mesh network.

To achieve full duplex communication, in some embodiments, the system devices disclosed herein can use time division multiplexing so that the firmware data is received or sent within predefined time frames. Accordingly, a single one of the system devices can receive parts or chunks of the firmware data from multiple devices in different time frames and can seed or send parts or chunks the firmware data to multiple devices in different time frames.

In some embodiments, one or more of the system devices can include multiple microcontrollers or programmable processors that require the firmware upgrade. In these embodiments, a primary microcontroller or programmable processor of the system device can directly interface with programming pins of a secondary microcontroller or programmable processor of the system device, thereby eliminating the need for a separate boot loader in the slave, secondary system device and saving memory space that would otherwise be allocated to such a boot loader. Accordingly, the primary microcontroller or programmable processor can act as a general programmer of the secondary microcontroller or programmable processor. In some embodiments, the primary microcontroller or programmable processor transmitting a first part or chunk of the firmware upgrade to the secondary microcontroller or programmable processor can be equivalent to the primary microcontroller or programmable processor executing a mass erase and write block function of the first part or chunk of the firmware upgrade in the secondary microcontroller or programmable processor. In some embodiments, when the firmware upgrade is complete, the programming pins of the secondary microcontroller or programmable processor that directly interface with the primary microcontroller or programmable processor can be reused as data and clock pins from the primary microcontroller or programmable processor to the secondary microcontroller or programmable processor.

Figure 3:
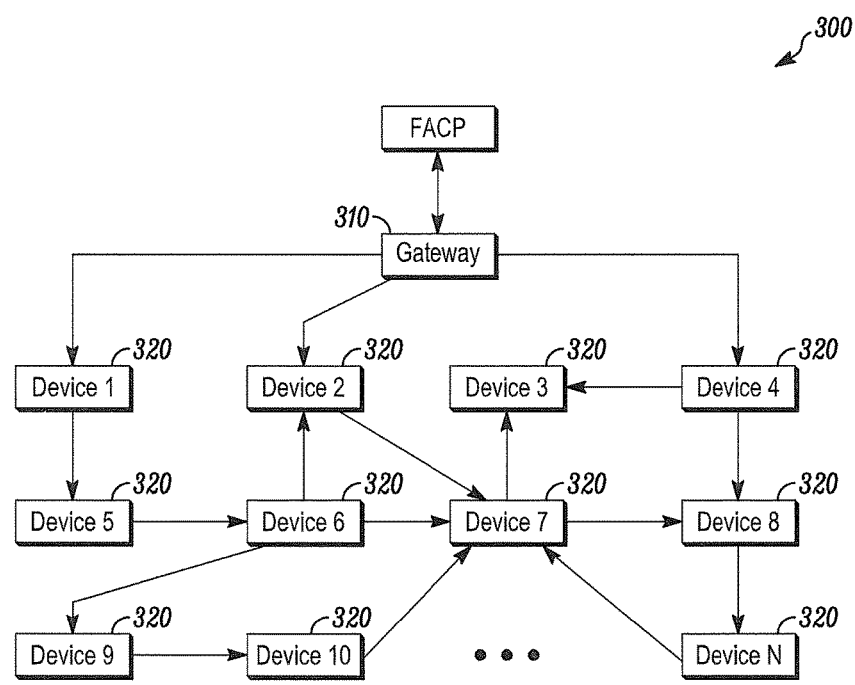
FIG. 3 is a block diagram of a wireless fire detection system in accordance with disclosed embodiments.

FIG. 3 is a block diagram of a wireless fire detection system 300 in accordance with disclosed embodiments. As seen in FIG. 3, although the firmware upgrade can be initially seeded by the gateway device 310, when a first of the system devices 320 has received a portion of the firmware data, for example, all of the firmware upgrade or a first part or chunk of the firmware upgrade, the first of the system devices 320 can seed that portion of the firmware data to other ones of the system devices 320. Simultaneously or in parallel, the first of the system devices 320 can receive other portions of the firmware data from the gateway device 310 or from the other ones of the system devices 320 that have the other portions of the firmware data to seed. Accordingly, in some embodiments, the firmware upgrade need not be seeded or transmitted via a predetermined path, and FIG. 3 illustrates just one exemplary path for seeding the firmware upgrade.

Figure 4:
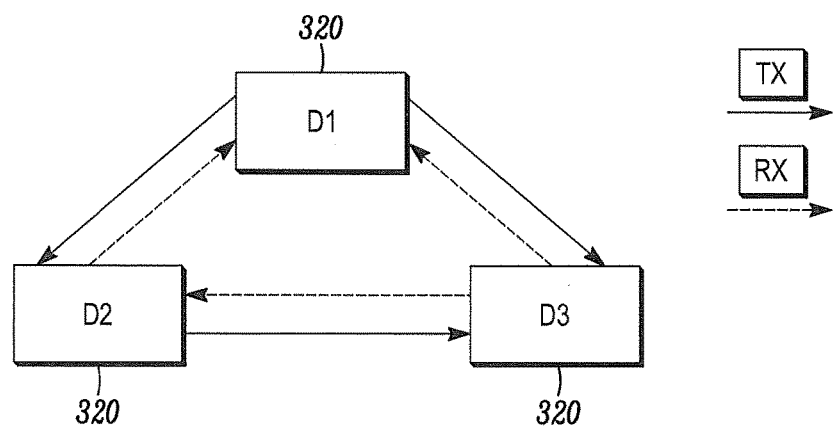
FIG. 4 is a block diagram of system devices exchanging firmware data in accordance with disclosed embodiments.

FIG. 4 is a block diagram of the system devices 320 exchanging the firmware data in accordance with disclosed embodiments. As seen in FIG. 4, a plurality of the system devices D1, D2, D3 can simultaneously exchange (transmit and receive) the firmware data with each other. For example, the system device D2 can receive firmware upgrade seeds from the system devices D1, D3. Furthermore, once the system device D2 receives a portion of the firmware upgrade, the system device D2 can seed that portion of the firmware upgrade to the system devices D1, D3 responsive to a request therefor from the system devices D1, D3.

Figure 5:
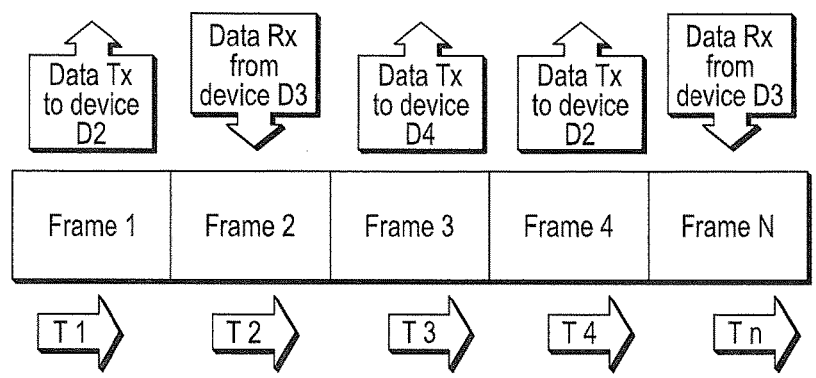
FIG. 5 is a block diagram of data exchange time frames for a system device in accordance with disclosed embodiments.

As explained above, the system devices D1, D2, D3 can use time division multiplexing so that the firmware data is received or sent within predefined time frames. For example, FIG. 5 is a block diagram of the data exchange time frames for the system device D1 in accordance with disclosed embodiments. As seen in FIG. 5, T1-Tn are the time frames into which the firmware data can be split and can be sent and received between the system devices D1, D2, D3. For example, during the time frame T1, the system device D1 can transmit some or all of the firmware data to the system device D2. During the time frame T2, the system device D1 can receive some or all of the firmware data from the system device D3. During the time frame T3, the system device D1 can transmit some or all of the firmware data to a system device D4. During the time frame T4, the system device D1 can transmit some or all of the firmware data to the system device D2. During the time frame T5, the system device D1 can receive some or all of the firmware data from the system device D3. The firmware data that the system device D1 transmits in any given time frame can be based on the portion of the firmware data that that system device D1 has received and the portion of the firmware data that has been requested from D1. Similarly, the firmware data that the system device D1 receives in any given time frame can be based on the portion of the firmware data that the system device D1 requests from other ones of the system devices D2, D3.

Figure 6:
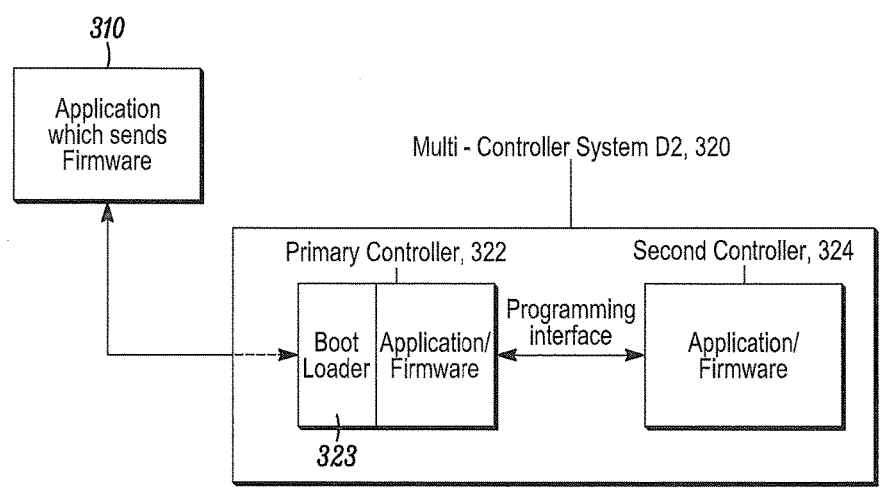
FIG. 6 is a block diagram of a system device with a primary microcontroller and a secondary microcontroller in accordance with disclosed embodiments.
Figure 7:
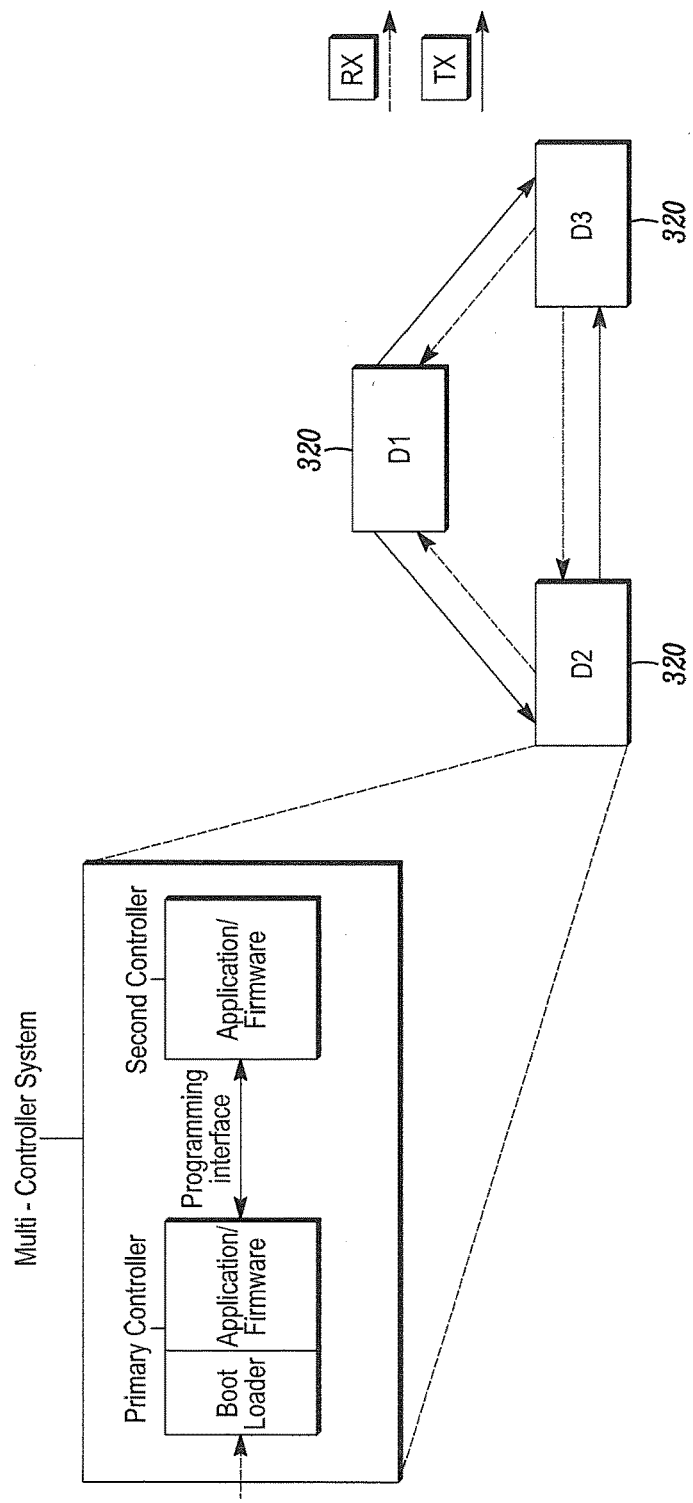
FIG. 7 is a block diagram of system devices exchanging firmware data in accordance with disclosed embodiments.

As further explained above and as illustrated in FIG. 6 and FIG. 7, in some embodiments, when one of the system devices D2 includes both a primary microcontroller 322 and a secondary microcontroller 324 that require the firmware upgrade, the primary microcontroller 322 can directly interface with programming pins of the secondary microcontroller 324. Accordingly, while the primary microcontroller 322 can include a separate boot loader 323 to receive the firmware upgrade from the gateway device 310, the secondary microcontroller 324 can be programmed directly by the primary microcontroller 322, thereby avoiding the need for a separate boot loader in the secondary microcontroller 323.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system for parallel firmware upgrade of multiple system devices in a mesh network and reducing overall time for upgrading all the systems devices, comprising:
   a plurality of system devices in the mesh network of a connected system;
   a gateway device coupled to the mesh network;
   the plurality of system devices and the gateway device having memory for storing computer-executable instructions and at least one processor in each of the plurality of the system devices and the gateway device that executes the computer-executable instructions to:
   divide a firmware upgrade into a plurality of divided parts;
   use, by the plurality of the system devices, time division multiplexing to send and receive the parts of the divided firmware upgrade within predefined time frames;
   transmit, by the gateway device, one or more parts of the divided firmware upgrade to a first of the plurality of the system devices;
   transmit, by the first of the plurality of system devices, after receiving all of the parts of the divided firmware upgrade or a first part of the plurality of the divided parts of the firmware upgrade, all or the first part of the plurality of divided firmware upgrade to a second of the plurality of the system devices;
   receive, by all of the plurality of system devices, multiple parts of the divided firmware upgrade from one device or different devices simultaneously;
   receive, by a secondary microcontroller of one or more of the plurality of the system devices, the firmware upgrade directly from a primary microcontroller of the one or more of the plurality of system devices through programming pins of the secondary microcontroller; and
   upgrade the plurality of the system devices using the received firmware upgrade.

2. The system of claim 1 wherein the connected system is a wireless fire detection system, is a security system, or includes a plurality of IoT devices.

3. The system of claim 1 wherein respective firmware of each of the plurality of system devices is upgraded simultaneously.

4. The system of claim 1 wherein, when the first of the plurality of system devices receives the first of the plurality of divided parts, the first of the plurality of system devices seeds the first of the plurality of divided parts to the second of the plurality of system devices.

5. The system of claim 4 wherein the first of the plurality of system devices seeds the first of the plurality of divided parts to the second of the plurality of system devices responsive to a request from the second of the plurality of system devices.

6. The system of claim 4 wherein the first of the plurality of system devices seeds the first of the plurality of divided parts to a third of the plurality of system devices in parallel with seeding the first of the plurality of divided parts to the second of the plurality of system devices.

7. The system of claim 4 wherein the second of the plurality of system devices receives a second of the plurality of divided parts from the gateway device or from a third of the plurality of system devices in parallel with receiving the first of the plurality of divided parts from the first of the plurality of system devices.

8. The system of claim 1 further comprising:
   a primary microcontroller of the first of the plurality of system devices; and
   a secondary microcontroller of the first of the plurality of system devices,
   wherein the primary microcontroller directly interfaces with programming pins of the secondary microcontroller to seed the firmware upgrade to the secondary microcontroller.

9. A method for parallel firmware upgrade of multiple system devices in a mesh network and reducing overall time for upgrading all the system devices, comprising:
   providing a plurality of system devices in the mesh network of a connected system;
   coupling a gateway device to the mesh network;
   executing computer-executable instructions by the plurality of system devices and the gateway device having memory for storing the computer-executable instructions and at least one processor in each of the plurality of system devices and the gateway device for executing the computer-readable instructions;
   dividing a firmware upgrade into a plurality of divided parts;
   using, by the plurality of the system devices, time division multiplexing to send and receive the plurality of divided parts of the firmware update within predefined time frames;
   transmitting, by the gateway device, one or more parts of the plurality of divided firmware upgrade to a first of the plurality of system devices;
   transmitting, by the first of the plurality of the system devices, after receiving all of the divided parts of the firmware upgrade or a first part of the one or more of the plurality of the divided parts of the firmware upgrade, all or the first part of the firmware upgrade to a second of the system devices;
   receiving, by all of the plurality of the system devices, multiple parts of the plurality of the divided firmware upgrade from one device or different devices simultaneously;
   receiving, by a secondary microcontroller of one or more of the system devices, firmware upgrade directly from a primary microcontroller of the one or more of the plurality of the system devices through programming pins of the secondary microcontroller; and
   upgrading the plurality of the system devices with the received firmware upgrade.

10. The method of claim 9 wherein the connected system is a wireless fire detection system, is a security system, or includes a plurality of IoT devices.

11. The method of claim 9 further comprising simultaneously upgrading respective firmware of each of the plurality of system devices.

12. The method of claim 9 further comprising, when the first of the plurality of system devices receives the first of the plurality of divided parts, the first of the plurality of system devices seeding the first of the plurality of divided parts to the second of the plurality of system devices.

13. The method of claim 12 further comprising the first of the plurality of system devices seeding the first of the plurality of divided parts to the second of the plurality of system devices responsive to a request from the second of the plurality of system devices.

14. The method of claim 12 further comprising the first of the plurality of system devices seeding the first of the plurality of divided parts to a third of the plurality of system devices in parallel with seeding the first of the plurality of divided parts to the second of the plurality of system devices.

15. The method of claim 12 further comprising the second of the plurality of system devices receiving a second of the plurality of divided parts from the gateway device or from a third of the plurality of system devices in parallel with receiving the first of the plurality of divided parts from the first of the plurality of system devices.

16. The method of claim 9 further comprising a primary microcontroller of the first of the plurality of system devices directly interfacing with programming pins of a secondary microcontroller of the first of the plurality of system devices to seed the firmware upgrade to the secondary microcontroller.

\* \* \* \* \*